May 3, 1960   A. J. IMMESOETE   2,935,036
SIDE DRESSING ATTACHMENT FOR TRACTOR CULTIVATORS
Filed Dec. 29, 1955   3 Sheets-Sheet 1

FIG. I

INVENTOR.
ARTHUR J. IMMESOETE
ATTORNEYS

May 3, 1960 A. J. IMMESOETE 2,935,036
SIDE DRESSING ATTACHMENT FOR TRACTOR CULTIVATORS
Filed Dec. 29, 1955 3 Sheets-Sheet 2

INVENTOR.
ARTHUR J. IMMESOETE
BY
ATTORNEYS

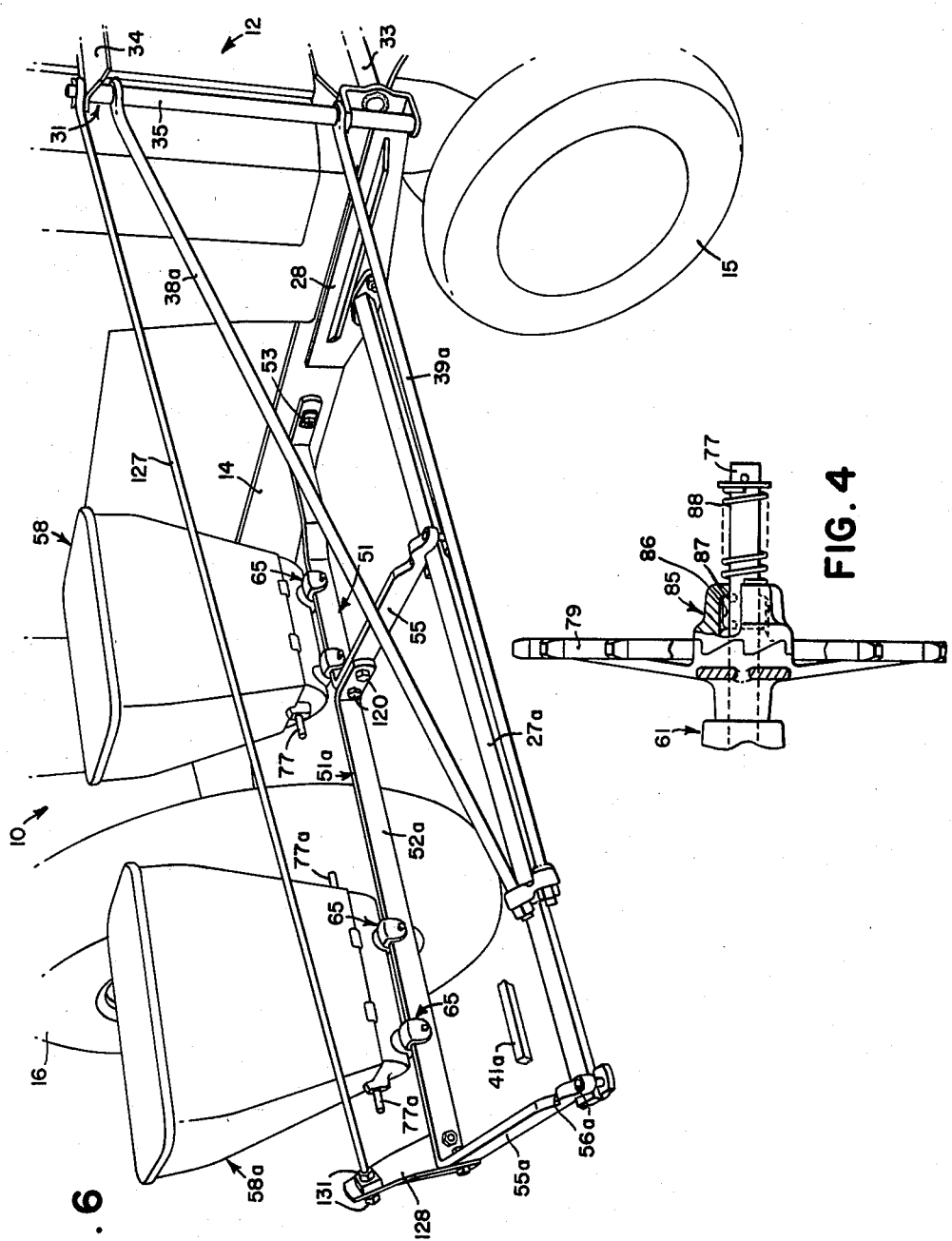

United States Patent Office 2,935,036
Patented May 3, 1960

2,935,036

SIDE DRESSING ATTACHMENT FOR TRACTOR CULTIVATORS

Arthur J. Immesoete, Moline, Ill., assignor, by mesne assignments, to Deere & Company, a corporation of Delaware Application December 29, 1955, Serial No. 556,192

7 Claims. (Cl. 111—59)

The present invention relates generally to agricultural implements and more particularly to fertilizer distributors such as those that are referred to as side dressing attachments for application to tractor mounted cultivators and the like.

The object and general nature of the present invention is a provision of a side dressing attachment applicable to tractor mounted cultivators for distributing fertilizer along the ground while the latter is being cultivated, the side dressing attachment being so constructed and arranged as to include attachment frame means carried by the cultivator frame and normally carried therewith, with detachable hoppers removably associated with the attachment frame and readily removed therefrom when it is desired to eliminate the side dressing operation.

Another feature of this invention is a provision of new and improved means for controlling the application of fertilizer to the soil being cultivated, such new and improved means including control gates adapted to be opened and closed at the same time that the cultivator rigs are moved between lowered and raised position, respectively, the opening and closing of the fertilizer control gates eliminating any necessity for stopping the agitator mechanism that is normally driven from the tractor motor and constantly running so long as the tractor is in operation, whether during cultivating or during transport.

Other features of the present invention include the provision of new and improved hopper and fertilizer distributing mechanism, wherein the gates are arranged in pairs and operated by means that is connected with the gates through equalizing mechanism, which is biased by suitably arranged spring means to return the gates to their closed position, the gates being opened automatically whenever the cultivator rigs or soil working tools are lowered. Another feature of this invention is the provision of brackets adapted to be fixedly mounted on the attachment frame and so constructed and arranged as to receive and support the fertilizer conduits by which fertilizer, under the control of the gates as mentioned above, is delivered to the cultivator tools.

These and other objects and advantages of the present invention will be apparent to those skilled in the art after a consideration of the following detailed description, taken in conjunction with the accompanying drawings, in which:

Fig. 4 is a sectional view showing the manually controlled clutch that may be operated to disconnect the drive from the agitator shaft of the hopper.

Fig. 6 is a view similar to Fig. 2 showing a side dressing attachment arranged for a four row tractor mounted cultivator.

Figure 1:
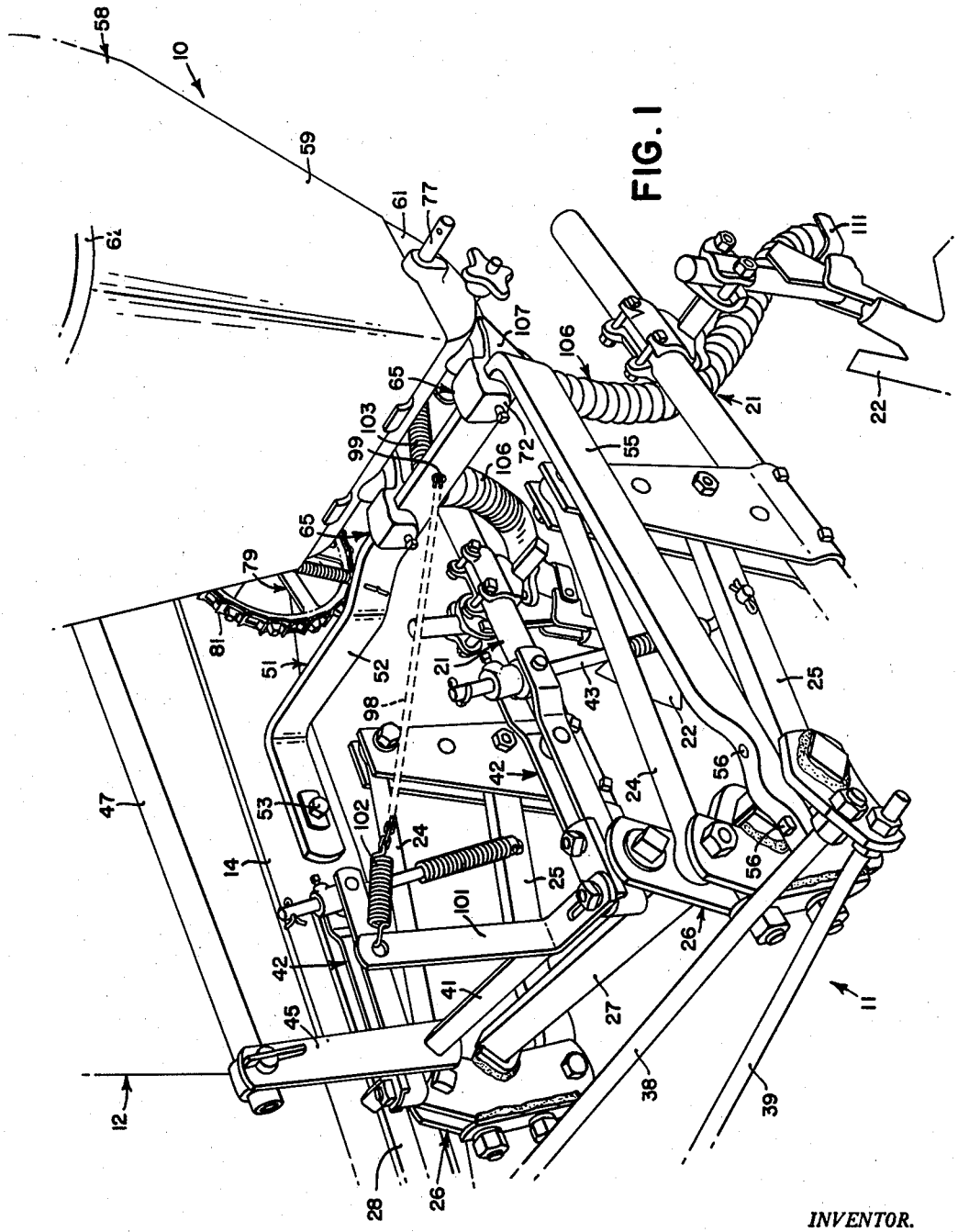
Fig. 1 is a fragmentary perspective view of a side dressing attachment for a two row tractor mounted cultivator.

The principles of the present invention have been shown by way of illustration in a side dressing attachment indicated in its entirety by the reference numeral 10, particularly adapted for connection to a tractor mounted cultivator indicated by the reference numeral 11 and suitably mounted on a farm tractor 12. The tractor 12 is of conventional construction, so far as the present invention is concerned, embodying a relatively narrow body 14 supported at its front end on closely spaced apart wheels 15 and relatively widely spaced rear wheels 16. The tractor 12 also includes suitable mechanism, such as a hydraulic power system operated by the engine of the tractor, for raising and lowering the tools of the cultivator, as will be described below in some detail, although the cultivator and the associated raising and lowering means is largely conventional, so far as the present invention is concerned.

The tractor cultivator 11 comprises a plurality of cultivating rigs 21, each of which includes one or more ground working shovels 22, carried for generally vertical movement on the pair of parallel links 24 and 25 pivotally connected at their forward ends to vertical brackets 26 carried on a laterally outwardly extending draft bar 27 the inner end of which is fixed to a generally rearwardly extending frame member 28 disposed alongside and suitably connected to the side of the tractor. There is a laterally outwardly extending draft bar 27 and associated frame bar 28 at each side of the tractor, and each of the frame bars 28 extends forwardly relative to the tractor and is pivotally connected with an associated vertical hitch structure 31 that is detachably connected to the front of the tractor. Such hitch structure includes a front transverse connecting member 33 connected to the lower part of the front of the tractor and an upper connecting member 34, both of these connecting members being apertured at the end portions to receive a pair of vertical rods 35 forming pivot means by which each frame member 28 is pivotally connected with the vertical hitch structure 31. Each of the draft bars 27 is re-enforced by a pair of brace bars 38 and 39 that are connected at their outer ends to outer portions of the associated draft bar and at their inner ends to vertically spaced apart points of connection with the associated pivot rod 35. Cultivator mounting mechanism of this kind is shown in the patent to Johnson 2,423,148 issued July 1, 1947, to which reference may be had if necessary.

The several cultivator rigs 21 are raised and lowered by means of a rock shaft 41 carried in the upper portions of the brackets 26, there being one rockshaft 41 for each of the draft bars 27. Arms 42 are fixed to the rockshaft 41 and connected with the associated rigs through links 43 or other suitable connecting means. The rockshaft 41 is operated by means of an arm 45 that is connected to the inner end of a rockshaft 41 and operated by means of a push pipe 47 or other suitable means controlled and/or operated from the tractor. When the push pipes 47, there being one at each side of the tractor, are moved forwardly, both rockshafts 41 are rocked, and the associated cultivator rigs 21 are raised from an operating position into a transport position.

The side dressing attachment, which forms the principal part of the present invention, includes a pair of generally L-shaped auxiliary frame bars 51, there being one at each side of the tractor, each frame bar 51 including a rear transversely extending section 52 that is disposed generally parallel to the associated draft bar 27 and is connected at its inner end, as at 53, to the side of the tractor in rigid relation therewith. Each auxiliary frame 51 also includes an outer fore-and-aft extending bar section 55 which extends at right angles to the parallel section 52 and at its forward end receives suitable clamping means 56 by which the forward end of the frame section 55 is rigidly connected to the outer end of the associated frame bar 27. When the securing means 53 and 56 are completely tightened, the auxiliary frame 51 is rigidly supported, partly on the tractor and partly on the associated draft bar 27 of the cultivator mechanism.

Mounted on each of the transverse frame bar sections 52 is a fertilizer hopper 58 of suitable configuration, each hopper 58 including a body section 59 generally formed of sheet metal or the like, and a bottom section 61, preferably formed as a casting. The upper or main hopper section 59 is closed by a cover 62.

Each hopper 58 is mounted on the associated auxiliary frame bar section 52 by means that includes a pair of brackets 65 that are rigidly fixed to the frame section 52. Each bracket 65 comprises a generally flat hopper-receiving section 66, the hopper bottom having apertured bosses 67 at the front and rear sides of the hopper bottom 61 to facilitate the support of the hopper on the hopper brackets 65. The front section of each of the hopper brackets 65 is formed with a hook section 69 that is adapted to engage over the upper edge of the associated frame bar 52 with portions 71 and 72 extending downwardly along the outer side and inner side, respectively, of the bar 52. The lower portions of the bracket sections 72 are adapted to receive fastening set screws 73. As will best be seen from Fig. 1, the brackets 65 rigidly support the hopper on the frame 51 so that the hopper lies rearwardly of the frame section 52 to provide space for the associated fertilizer conduits to which detailed reference will be made below. The ends of the hopper bottom 61 are formed with openings to receive an agitator shaft 77 on which agitator means 78 is mounted inside the hopper. The shaft 77 extends from one side to the other of the tractor, extending across the latter in any suitable space available on the tractor, and the shaft 77 is driven by sprocket 79 fixed to the shaft 77 and receiving a sprocket chain 81 that is trained over the sprocket 79 and over a driving sprocket 83 fixed to some rotatable part on the tractor that is actuated by the tractor motor, such as the brake drum shaft 84. The sprocket 79 is loosely mounted on the shaft 77 but is connected to rotate the shaft 77 by means of a manually operated clutch member 85 that is so constructed and arranged that, when the outfit is to be transported for considerable distances, the sprocket 79 may be disconnected from the shaft 77 to disengage the clutch 85 from the sprocket 79 by shifting the part 85 to carry the driving slots 86 thereof away from a pin 87 or the like carried by the shaft 77 and then turning the part 85 slightly so as to carry the slots 86 away from the pin, whereupon the spring 88 will hold the member 85 against the pin 87 and the latter will then prevent reengagement of the part 85 with the sprocket 79. Normally, the sprocket 79 is left connected with the shaft 77 so that the latter is rotated whenever the tractor motor is operated and the tractor is in motion.

Figure 2:
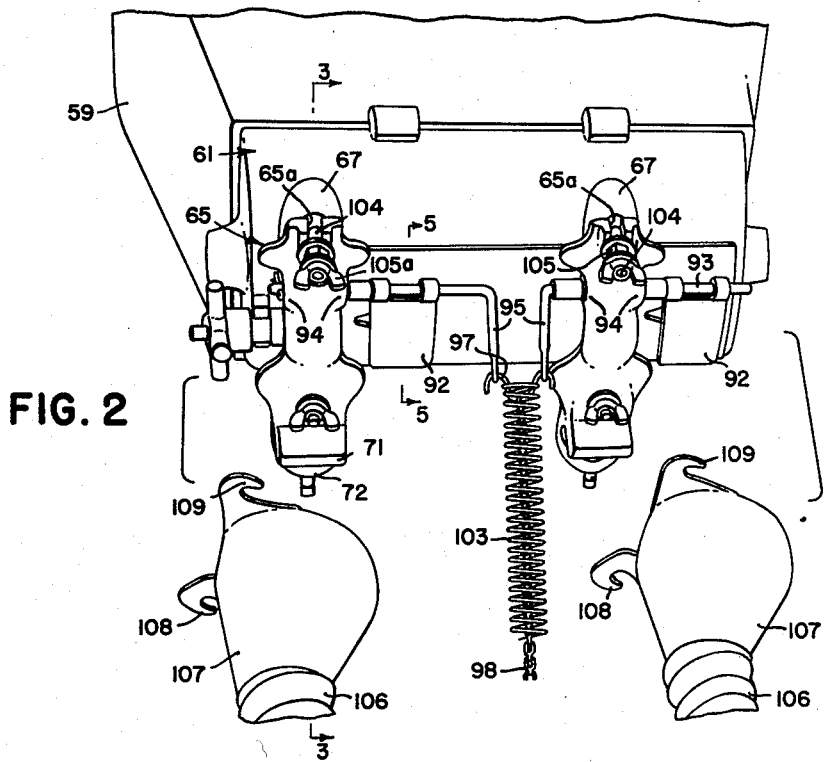
Fig. 2 is a fragmentary perspective view, exploded in nature, showing the hopper attaching means and associated parts.
Figure 3:
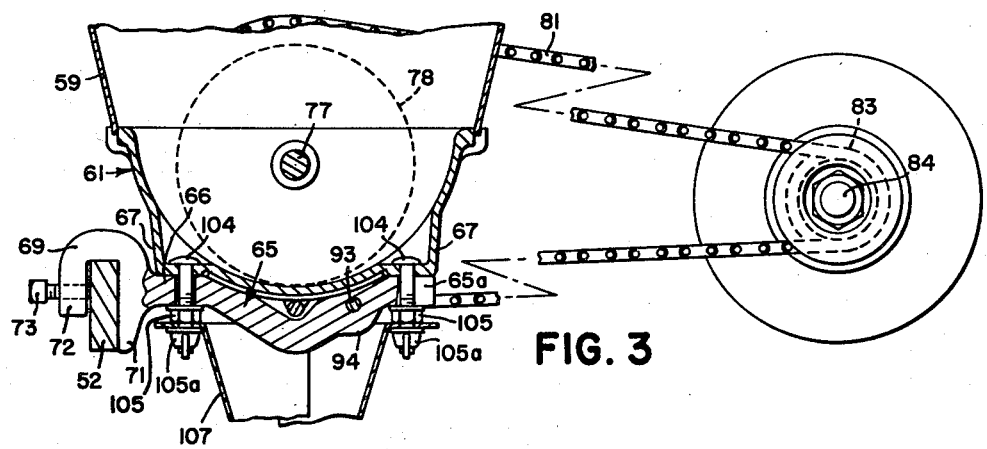
Fig. 3 is a sectional view taken generally along the line 3—3 of Fig. 2, showing the hopper mounting means and associated parts.
Figure 5:
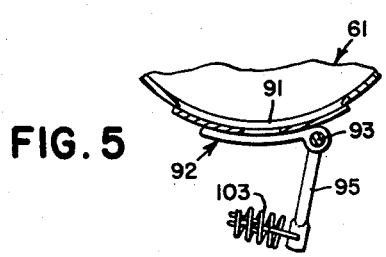
Fig. 5 is a fragmentary sectional view taken generally along the line 5—5 of Fig. 2.

Each of the hopper bottoms 61 is provided with a pair of discharge openings 91, and each opening 91 is adapted to be covered by a gate 92. There are two gates 92 for each hopper, one gate for each hopper opening 91, and each gate 92 is fixed to a shaft 93 that is rockably mounted in a bearing section 94 formed in the adjacent hopper bracket 65. As will best be seen in Fig. 2, the two shafts 93 are mounted in alignment and the adjacent ends carry operating parts in the form of actuating arms 95. Connected to the two arms 95 is an equalizing bar 97 that is connected at its ends with the arms 95, the intermediate or middle portion of the equalizer bar 97 receiving a tension element 98 that extends forwardly through an opening 99 in the adjacent portion of the auxiliary frame bar section 52 to an arm 101 that is fixed to the cultivator lift shaft 41. The element 98 is connected to the arm 101 through a tension spring 102 (Fig. 1). Bearing against the equalizer bar 97 is a compression spring 103, through which the tension element 98 extends. The forward end of the spring 103 bears against the rear face of the auxiliary frame bar section 52 at points around the opening 99 through which the element 98 extends.

The boss sections 67 of the hopper bottom 61 are apertured to receive two bolts 104 and the latter carry nuts 105 by which the hopper is secured to the associated pair of hopper supporting brackets 65, the rear ends of the latter being notched, as at 65a, to receive the rear bolts 104. Also carried by the brackets 65 is a pair of fertilizer conduits 106, each having a spout section 107 at its upper end and equipped with notched lugs 108 and 109 that are adapted to be engaged under auxiliary wing nuts 105a that are carried by the outermost ends of the bolts 104, by which means the fertilizer conduits are supported from the hopper bracket 65 and extend downwardly from the hopper rearwardly of the associated auxiliary frame bar section 52. The lower ends of the fertilizer tubes 106 are connected, as at 111, to the associated cultivator shovel or tool 22.

The operation of the side dressing attachment of the present invention, as so far described, is substantially as follows.

The auxiliary frame member 51 is firmly and rigidly attached to the tractor and to the outer end of the associated draft bar 27 of the cultivator, and then the hopper brackets 65 are firmly fixed to the parallel portion 52 of the auxiliary frame member 51. The hoppers 58 are then mounted on the associated brackets and the upper or spout sections of the fertilizer conduits 106 are connected in place. The shaft 77 and agitator 78 are then attached and the driving sprocket 79 connected with the drive pinion 83 by the driving chain 81. The clutch 85 is then operated to connect the sprocket 79 to the associated shaft 77, and the outfit is then ready for operation. When the cultivator rigs 21 are raised by rocking the shaft 41 forwardly, the arm 101 exerts a pull through the tension element 98 and this acts through the shafts 93 to close the gates 92 against the associated hopper bottom openings 91, thus cutting off all flow of fertilizer so long as the rigs are held in their raised position. The springs 102 apply a yielding force acting to maintain the gates 90 closed, each spring 102 being connected directly to the associated arm 101.

When the cultivator rigs are lowered into operating position, the rockshaft 41 rocks rearwardly, carrying with it the arm 101, and the rearward movement of the latter relaxes the pull on the gates and the compression spring 103 moves the gates 92 to their opened position, permitting the discharge of fertilizer through the openings 91 and downwardly through the tubes 106 to the furrows opened by the associated shovels 22.

After the side dressing operations have been completed, it is usually preferable to remove the hoppers 58, and this may readily be done by disconnecting the driving chain 81 and the shaft 77, disconnecting the lower ends of the fertilizer tubes from the cultivator shovels, and then loosening the set screws 73 and lifting each hopper, together with the associated brackets 65, from the associated supporting frame bar section 52. Usually the auxiliary frame 51 is left connected with the cultivator draft bar 27 since it does not interfere with the operation of the cultivator itself, but if it should be desired to disconnect the cultivator from the tractor, the only operation required in addition to the normal cultivator-disconnecting operation is the removal of the connection 53 between the inner end of each auxiliary frame and associated tractor and the disconnection of the clamping means 56.

The side dressing attachment described above is designed primarily for two-row operation, but a four-row side dressing attachment embodies substantially the same means described above, plus certain additions, which will now be described.

Referring now to Fig. 6, the four-row side dressing attachment may be constructed by adding to the two-row attachment a pair of outer auxiliary frame members 51a, which is similar in construction to the members 51 described above, having a parallel section 52a and a fore-and-aft extending section 55a that is firmly clamped, as at 56a, to the outermost end of the four-row draft bar 27a. The inner end of the parallel frame section 52a is connected to the rear outer portion of the two-row frame member 52 by bolt connections 120. A second hopper 58a, substantially identical with the hoppers 58 described above, is added to the outer frame section 52a and its shaft 77a connected in any suitable way to the agitator shaft 77 of the laterally inner hopper 58. The gates of the laterally outer hopper 58a are opened and closed by a connection with the four-row cultivator rockshaft 41a that is substantially identical with the connections described above, and hence further description is unnecessary. The four-row draft bar 27a is braced by two brace rods or bars 38a and 39a, similar to the bars 38 and 39 described above.

The auxiliary frame members 51 and 51a may not provide the necessary rigidity to support two hoppers, and for the purpose of re-enforcing the auxiliary frame means that is provided, at each side of the tractor, a third brace rod 127 that extends from the upper end of the associated rod 35 downwardly, outwardly and rearwardly to an upwardly extending bracket 128 that is fixed to the rear outer corner of the frame member 51a, the upper end of the bracket 128 being apertured to receive the rear outer end of the brace rod 127. Each bracket 128 is apertured and each brace rod 127 is threaded and carries a pair of lock nuts 131. If desired or necessary, a similar brace rod construction may be provided for the two row side dressing attachment.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A material dispensing means comprising frame means, a hopper carried by said frame means and having a bottom with a pair of spaced apart discharge openings therein, a pair of gates, pivot means pivotally mounting said gates on the hopper bottom so that the gates are movable to open and close said discharge openings, a pair of arms fixed, respectively, to said gates and movable in a given direction to shift said gates, an evener bar, means pivotally connecting the ends of said bar with said arms, respectively, whereby movement of said bar in said direction serves to shift said gates, means pivotally connected with the intermediate portion of said evener bar and shiftable in said given direction for moving said gates toward one position, and spring means connected to act between said frame means and said evener bar between the ends thereof for urging the gates to move toward their other position.

2. A material dispensing means comprising a support having an opening therein, a pair of brackets mounted on said support, one at each side of said opening, a hopper mounted on said brackets and having a bottom with a pair of spaced apart discharge openings therein, one adjacent each bracket, a pair of gates pivotally mounted on the hopper bottom and movable thereon to open and close said discharge openings, an evener bar, means pivotally connecting the ends of said bar with said gates, respectively, whereby movement of said evener bar in a given direction serves to shift said gates, said evener bar being disposed between said brackets, a compression spring extending between said evener bar and said support and engaging the latter around said opening therein, a tension element extending through said support opening and said compression spring and connected with the intermediate portion of said bar for shifting said evener bar in said given direction, and means connected with said tension element to move said evener bar against the action of said spring.

3. The invention defined in claim 2, further characterized by shafts supported by said brackets and hopper bottom and fixed to said gates, arms on the adjacent ends of said shafts, and said evener bar being connected to the outer ends of said arms.

4. The invention defined in claim 3, further characterized by a pair of conduits carried by said brackets and positioned to receive material discharged through said hopper bottom openings.

5. A fertilizer distributor comprising a hopper having a pair of discharge openings, a pair of axially aligned shafts, journal means on said hopper rockably receiving said shafts for independent rocking movement adjacent said openings, respectively, a pair of control gates fixed to said shafts, respectively, adjacent said openings and movable between positions opening and closing said discharge openings, a pair of actuating arms fixed to the adjacent ends of said shafts, an equalizer bar pivotally connected at its ends with said arms, means pivotally connected with the generally central portion of said equalizer bar to move said gates to one of its closed and open positions, and a second means also connected with said equalizer bar to move said gates to the other of said positions.

6. A fertilizer distributor comprising frame means, a hopper carried by said frame means and having a pair of discharge openings, a pair of hopper supporting brackets carried by said frame means and fixed to said hopper adjacent said openings, each of said brackets having a bearing section, a rock shaft disposed in each bearing section, a pair of control gates fixed to said shafts, respectively, so as to overlie said discharge openings, whereby said gates are movable between open and closed positions away from and toward said openings, a pair of arms fixed to the adjacent ends of said shafts, an equalizer bar pivotally connected at its ends with said arms, respectively, an element pivotally connected at one end with the intermediate portion of said equalizer bar, means connected with the other end of said element for exerting a pull on the element to rock said shafts in a direction to open said gates, and resilient means connected with said equalizer bar between its ends and reacting against said frame means to swing said arms in a direction to open said gates when said pull on the element is released.

7. A side dressing attachment for a cultivator having rig raising and lowering means, comprising frame means, a hopper carried by said frame means and having a pair of discharge openings, a pair of control gates, means shiftably connecting the gates to the hopper whereby the gates are movable between open and closed positions away from and against said discharge openings, each gate having an operating part connected to move said gate when shifted in a given direction, an equalizer bar movably connected at its ends with said parts to shift the latter in said direction, means connected pivotally with the equalizing bar between the ends of the latter and with said rig raising and lowering means to close said gates, when said rig raising and lowering means raises said rigs, and means connected between said frame means and said equalizing bar for opening said gates when the rig raising and lowering means lower said rigs.

(References on following page)

References Cited in the file of this patent

UNITED STATES PATENTS

| | | |
|---|---|---|
| 215,864 | Bechtelle | May 27, 1879 |
| 508,321 | Johnson | Nov. 7, 1893 |
| 604,024 | Corser | May 17, 1898 |
| 611,184 | Rainey | Sept. 20, 1898 |
| 678,187 | Leary | July 9, 1901 |
| 1,271,007 | Beezley et al. | July 2, 1918 |
| 1,334,223 | Byrd | Mar. 16, 1920 |
| 2,210,994 | White | Aug. 13, 1940 |
| 2,375,850 | Johnson | May 15, 1945 |
| 2,410,937 | Harder | Nov. 12, 1946 |
| 2,685,384 | Tanke | Aug. 3, 1954 |
| 2,698,114 | Buhr | Dec. 28, 1954 |